United States Patent [19]
Faulk

[11] Patent Number: 5,818,702
[45] Date of Patent: *Oct. 6, 1998

[54] CONVERTER TOPOLOGIES WITH MULTIPLE WINDINGS

[75] Inventor: Richard A. Faulk, Cypress, Tex.

[73] Assignee: Compaq Computer Corporation, Houston, Tex.

[ * ] Notice: The term of this patent shall not extend beyond the expiration date of Pat. No. 5,706,182.

[21] Appl. No.: 870,520

[22] Filed: Jun. 6, 1997

Related U.S. Application Data

[63] Continuation of Ser. No. 775,502, Dec. 31, 1996, Pat. No. 5,706,182.

[51] Int. Cl.[6] .......................... H02M 3/335; H02M 7/537
[52] U.S. Cl. ................................ 363/16; 363/21; 363/131
[58] Field of Search ................................ 363/15, 16, 21, 363/131, 20

[56] References Cited

U.S. PATENT DOCUMENTS

| | | | |
|---|---|---|---|
| 4,183,080 | 1/1980 | Liebman | 363/131 |
| 4,257,087 | 3/1981 | Cuk | 363/16 |
| 4,262,328 | 4/1981 | Bloom et al. | 363/16 |
| 5,122,946 | 6/1992 | Taylor | 363/21 |
| 5,363,287 | 11/1994 | Liu et al. | 363/20 |
| 5,442,539 | 8/1995 | Cuk et al. | 363/16 |
| 5,570,276 | 10/1996 | Cuk et al. | 363/16 |

*Primary Examiner*—Peter S. Wong
*Assistant Examiner*—Bao Q. Vu
*Attorney, Agent, or Firm*—Robert Groover; Betty Formby; Matthew S. Anderson

[57] ABSTRACT

Converter topologies in which two separate switching transistors and two capacitors are used on the input side. Preferably the two transistors are switched alternately, to alternately pull down different nodes in an inductor-capacitor chain. Two capacitors are interposed in series between an input inductor on the input and a transformer primary winding. Preferably the two transistors are connected with their parasitic diodes in opposite senses, so that one can source current from a first node to ground when off, and the other can sink current from a second node to ground when off.

20 Claims, 6 Drawing Sheets

CONVERTER TOPOLOGIES WITH MULTIPLE WINDINGS

This application is a continuation of parent application Ser. No. 08/775,502, filed Dec. 31, 1996, now issued U.S. Pat. No. 5,706,182.

BACKGROUND AND SUMMARY OF THE INVENTION

The present invention relates to "off-line" power converters in portable computers.

BACKGROUND: SWITCHED-MODE POWER CONVERSION

One of the recurring problems in electronic system design is the need to derive power from an externally determined source voltage to operate at a different voltage. In particular, "off-line" converters address the frequent need to efficiently translate the relatively high voltages of power mains (120V or 240V) into the lower voltages which are actually used by systems which include integrated circuits (e.g. 5V, 3.3V, or less). In portable systems, small volume (for a given power capability) and high efficiency are important goals for converters and power supplies. Power converter design has long been a very active area of engineering effort, and numerous circuit topologies have been proposed. See, e.g., Pressman, SWITCHING POWER SUPPLY DESIGN (1991); the 3 volumes of Middlebrook and Ćuk, ADVANCES IN SWITCHED-MODE POWER CONVERSION (2.ed. 1983); and all of the biennial UNITRODE POWER SUPPLY DESIGN SEMINAR HANDBOOKS; all of which are hereby incorporated by reference.

BACKGROUND: FLYBACK CONVERTERS

Flyback converters are a class of power converter topology which is common in off-line adapters. In this configuration a switching transistor switches the primary of a transformer. Each of the secondary windings of the transformer is connected through a diode (the "flyback" diode) to an output capacitor. While the switching transistor is on the current through the primary increases (storing energy in the transformer), and when the switch is opened, the stored energy is discharged at the transformer secondary through the flyback diode. Feedback is provided through a pulse-width modulation circuit which varies the switching waveform as the load impedance varies. The duty cycle and the turns ratio of the transformer are chosen to provide the desired output voltage range.

INNOVATIVE CONVERTER TOPOLOGIES WITH DECOUPLED TRANSFORMERS

The present application describes new converter topologies in which two independent and decoupled power transformers are used in a single integrated magnetic structure.

INNOVATIVE CONVERTER TOPOLOGIES WITH ANTI-PARALLEL SWITCHING TRANSISTORS ON PRIMARY SIDE

The present application also describes new converter topologies in which two separate switching transistors and two capacitors are used on the input side. Preferably the two transistors are switched alternately, to alternately pull down different nodes in an inductor-capacitor chain. Two capacitors are interposed in series between an input inductor on the input and a transformer primary winding. Preferably the two transistors are connected with their parasitic diodes in opposite senses, so that one can source current from a first node to ground when off, and the other can sink current from a second node to ground when off.

This permits ripple to be suppressed at the input, and also provides a clamping effect to suppress transient overvoltages. Thus this class of circuits solves a longstanding problem in isolated SEPIC converters.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
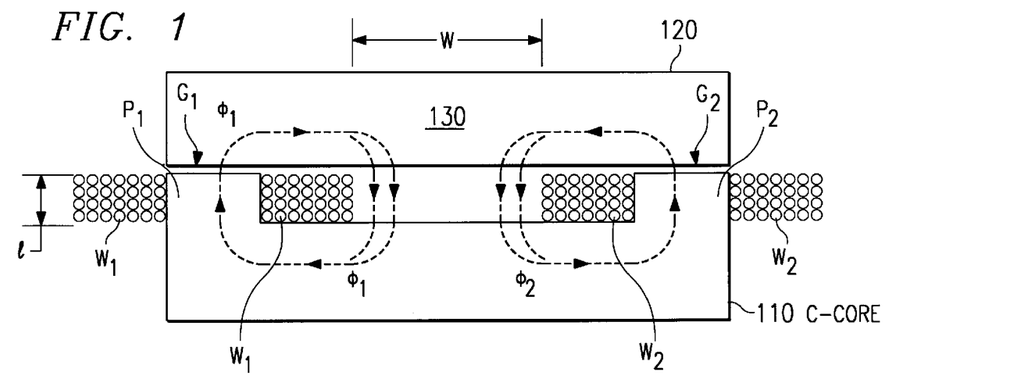
FIG. 1 shows an innovative integrated magnetic structure according to the presently preferred embodiment.

FIG. 1 shows an innovative integrated magnetic structure according to the presently preferred embodiment. This includes a C-shaped core piece 110, and a flat lid 120 which is assembled to the core piece 110. The core piece 110 and lid 120 are both made of high-permeability material, which in a sample embodiment is "P" material from Magnetic Inc. (This material has an initial permeability of approximately 2500.) In the example shown the cross section (in the plane of the page) of both plates, and both poles, is 0.10 inches. The width of the structure (i.e. the front-to-back dimension, which is normal to the page in the orientation illustrated) is 0.50 inches in the presently preferred embodiment. The height of each of the two legs of the 'C' shaped core is 0.2 inches overall. The total assembled height is approximately 0.3 inches.

The air gap of the two legs is defined by a teflon wrap on the planar lid 120, and is about 0.005 inches in the presently preferred embodiment. With this structure, it was experimentally determined that the inductive coupling coefficient k between two 20-turn planar-type coils placed on the two poles was less than 0.1 at 50 kHz.

FIG. 1 shows a sample embodiment of the innovative planar magnetic structure. A single molded C-core body 110 of high-permeability material has only two poles $p_1$ and $p_2$. (The view shown is cross-sectional, but the body 110 has the same cross-section all the way through.) One winding (or winding stack) $W_1$ is wound around pole $p_1$, and the flux generated by this winding $W_1$ recirculates through the lid 120 (which is also molded of the same high-permeability material) and the open space 130. Another winding (or winding stack) $W_2$ is wound around pole $p_2$, and the flux generated by this winding $W_2$ recirculates through the lid 120 (which is also molded of the same high-permeability material) and the open space 130. Note that the two windings $W_1$ and $W_2$ drive separate flux paths $\phi_1$ and $\phi_2$ respectively. The two flux paths both include a significant part of the width w of the open space 130 which laterally separates the two windings $W_1$ and $W_2$. In this embodiment air gaps $G_1$ and $G_2$ (which are not actually filled with air, but by a polymer film) are included in the two poles $p_1$ and $p_2$. Note that the reluctance of the flux paths $\phi_1$ and $\phi_2$ decreases as w is increased, and decreases rapidly as the height l of the open space 130 is decreased. Gap $G_1$ helps prevent flux path $\phi_2$ from being shunted by flux conduction through pole $P_1$, and gap $G_2$ helps prevent flux path $\phi_1$ from being shunted by flux conduction through pole $p_2$.

This structure permits more power to be transferred through a core of a given size. For a flyback application, the continuous power which can be transferred is:

$$P=(V_{in}I\delta)/2$$

where $$\delta=((NV_{out})/(V_{in}+NV_{out})).$$

So for a given Vin and Vout, power is a function of peak current only, i.e. δ does not vary with inductance. So the maximum power is $$P\max=((V_{in}*\delta)/2)*I_{max}=((V_{in}*\delta)/2)((B_{sat}l)/N_\mu).$$

But because the two halves of the C-core are independent (the two halves have effectively independent flux return paths), each does not contribute to the saturation of the other, so $P_c=2*P_e$.

Figure 5A:
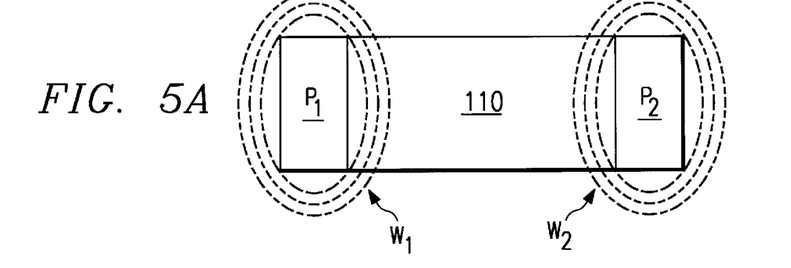
FIG. 5A is a plan view of the magnetic structure of FIG. 1, according to the presently preferred embodiment.

FIG. 5A is a plan view of the magnetic structure of FIG. 1, according to the presently preferred embodiment. In this view the core piece is shown from the side on which the poles are located, and the lid is not shown. Preferably (but not necessarily) the lid 120 has the same outer dimensions as the C-core 110.

Figure 5B:
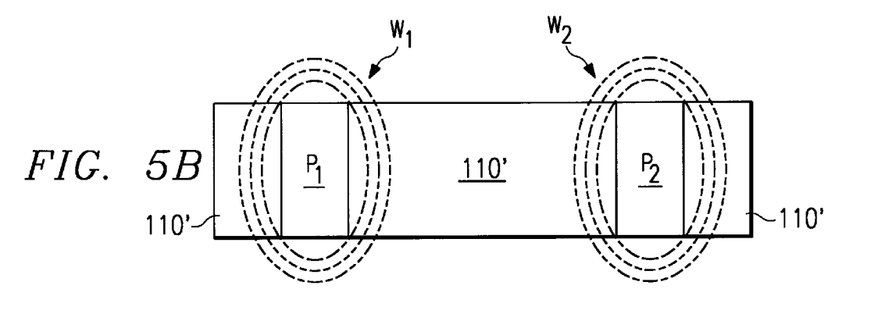
FIG. 5B is a plan view of an alternative embodiment of the magnetic structure of FIG. 1.

FIG. 5B is a plan view of an alternative embodiment of the magnetic structure of FIG. 1. For comparison, the dimensions of the pole pieces and coils may be assumed to be exactly the same in the four embodiments of FIGS. 5A–5D. In this embodiment the modified core 110' extends beyond the poles $p_1$ and $p_2$ in one direction. Preferably (but not necessarily) the lid 120 has the same outer dimensions as the C-core 110'.

Figure 5C:
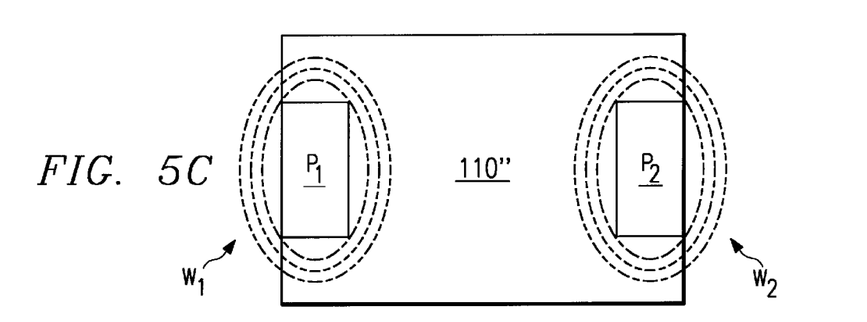
FIG. 5C is a plan view of another alternative embodiment of the magnetic structure of FIG. 1.

FIG. 5C is a plan view of another alternative embodiment of the magnetic structure of FIG. 1. In this embodiment the modified core 110" extends beyond the poles $p_1$ and $p_2$ in one direction (different from that used in FIG. 5B). Preferably (but not necessarily) the lid 120 has the same outer dimensions as the C-core 110".

Figure 5D:
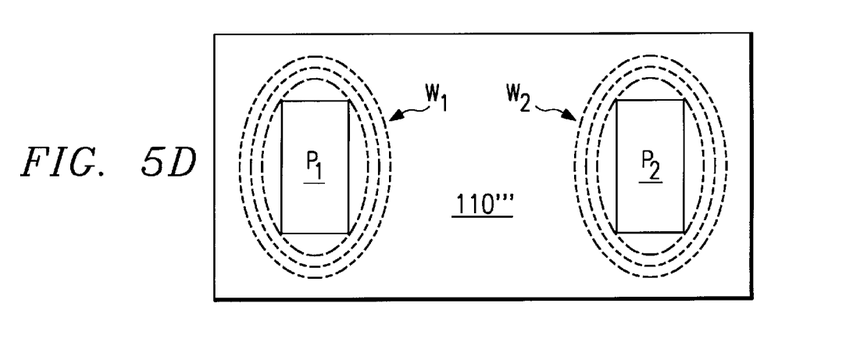
FIG. 5D is a plan view of yet another alternative embodiment of the magnetic structure of FIG. 1.

FIG. 5D is a plan view of yet another alternative embodiment of the magnetic structure of FIG. 1. In this embodiment the modified core 110''' extends beyond the poles $p_1$ and $p_2$ in two directions. Preferably (but not necessarily) the lid 120 has the same outer dimensions as the C-core 110'''.

Asymmetric-Coupling Structures

Figure 6A:
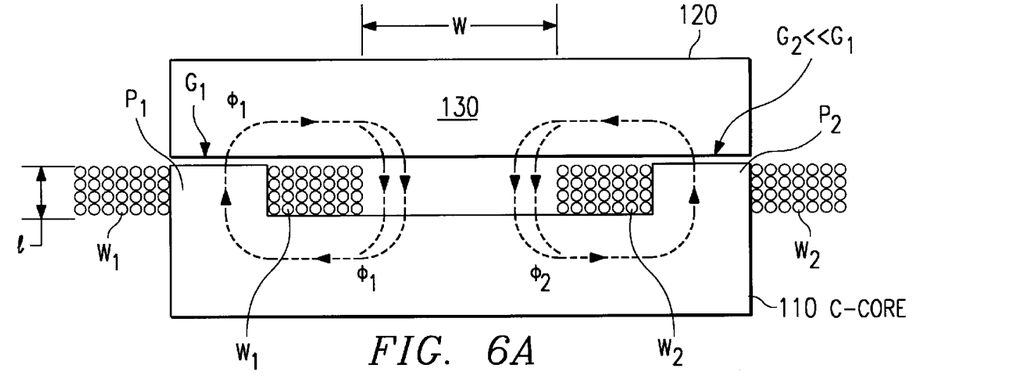
FIG. 6A shows an alternative integrated magnetic structure with asymmetrical gapping.

A further class of alternative embodiments uses asymmetric gapping for the two flux paths. If a "planar" magnetic structure has an air gap $G_1$ atop pole $p_1$ but no gap $G_2$ atop pole $p_2$, then flux generated by a winding $W_2$ on pole $p_2$ will largely be returned through the air return path described above. (More precisely, one gap includes a Teflon spacer, whereas the other gap is typically replaced by a butt joint. A butt joint will add some reluctance, but less than that of an intentionally-added air gap.) Thus an AC signal applied to the winding $W_2$ on pole $p_2$ will not be coupled strongly into the winding $W_1$ on pole $p_1$, i.e. the coupling from $W_2$ to $W_1$ is very weak. By contrast, for flux generated by the winding $W_1$ on pole $p_1$, the air return path is shunted by a lower-reluctance circuit through the magnetic material (passing through pole $p_2$), so this flux will be coupled to winding $W_2$. Thus an AC signal applied to the winding $W_1$ on pole $p_1$ will not be coupled significantly into the winding $W_2$ on pole $p_2$, i.e. the coupling from $W_1$ to $W_2$ is stronger than the coupling from $W_2$ to $W_1$. This asymmetry in coupling can be advantageously exploited in various ways, e.g. for ripple-steering.

Figure 6B:
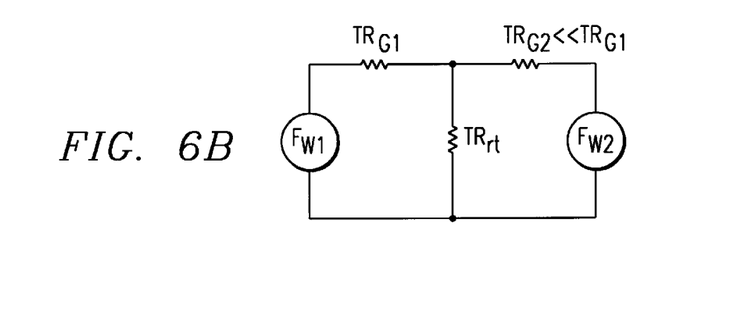
FIG. 6B is a magnetic circuit diagram of the structure of FIG. 6A.
Figure 7:
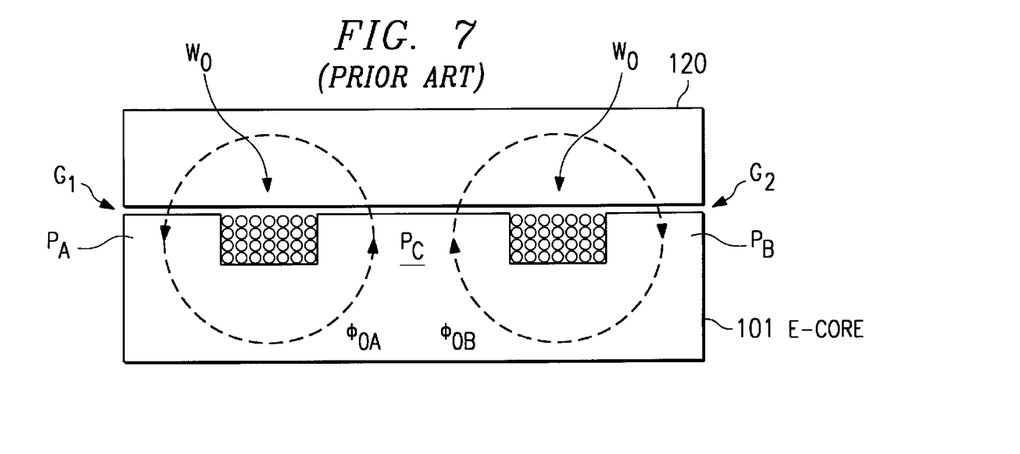
FIG. 7 shows a prior art planar magnetic structure.

FIG. 6A shows an alternative integrated magnetic structure with asymmetrical gapping, and FIG. 6B is a magnetic circuit diagram of the structure of FIG. 6A. This magnetic circuit diagram shows two mmf sources $F_{W1}$ and $_{W2}$ (provided by the two windings $W_1$ and $W_2$), and three reluctances $\Re_{G1}$, $\Re_{G2}$, and $\Re_n$ (provided respectively by gap $G_1$, gap $G_2$, and the air return path 130). In the embodiment of FIG. 1, the magnitude of either gap reluctance $\Re_{G1}$ or $\Re_{G2}$ is typically larger than the magnitude of the reluctance $\Re_n$ of the air return path; however, in the embodiment of FIG. 6A, the gap reluctance of one gap $\Re_{G2}$ is much smaller than the magnitude of the reluctance $\Re_n$ of the air return path. This results in the asymmetric coupling described above.

Alternatively, a lesser degree of asymmetry can be achieved by making one of the gaps $G_1$ and $G_2$ nonzero, but significantly smaller than the other gap.

Power Converter Topologies

The double-circuit integrated magnetic structures make certain circuit topologies more attractive. Several such examples will now be listed, but of course this does not preclude others.

Modified SEPIC-Type Converter

Figure 2A:
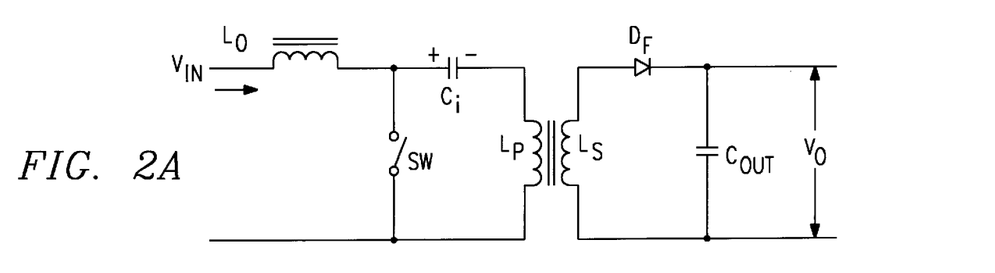
FIG. 2A shows a first sample power converter circuit topology, of the SEPIC type, which is advantageously implemented using the magnetic structure of FIG. 1.

As a first example of use of the magnetic structure of FIG. 1, FIG. 2A shows a SEPIC style converter circuit, in which an input inductor $L_0$ on the input is completely decoupled from the main transformer $L_p/L_s$. A switch SW modulates the current through the input inductor, and a capacitor $C_i$ is interposed between the input inductor and the transformer primary $L_p$. In this circuit the input inductor $L_0$ is preferably placed on one leg $p_1$ of a magnetic structure like that of FIG. 1, and the transformer primary and secondary coils $L_p/L_s$ are both stacked on the second leg $p_2$ of the magnetic structure.

In the structure of FIG. 2A, a conventional output diode $D_F$ and output capacitor $C_{out}$ provide an output voltage $V_o$, which is controlled by the turns ratio between the primary and secondary, and also by the duty cycle of the switch SW. As with other SEPIC-type converters, the structure in FIG. 2A steers ripple from the input side into the transformer primary $L_p$, i.e. no ripple appears on the input voltage $V_{in}$. A normal SEPIC-type converter can use a single magnetic structure, but the use of segregated magnetics provides reduces size for a given power output.

Note that no snubbing circuit is shown in FIG. 2A, and indeed no snubbing circuit is preferably used.

Compact Decoupled-Dual-Transformer Converter

Figure 2B:
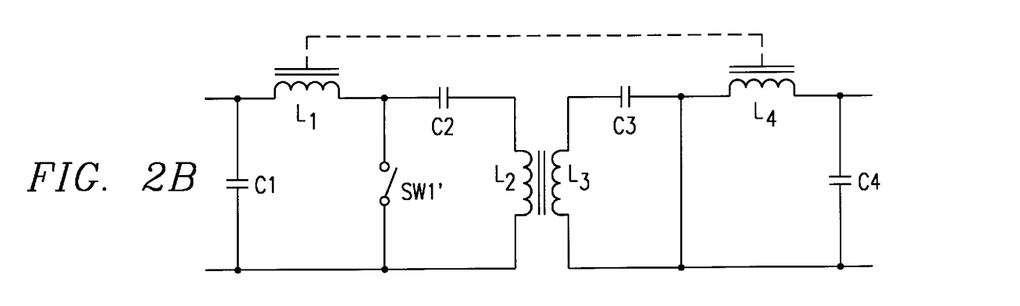
FIG. 2B shows a second sample power converter circuit topology which is advantageously implemented using the magnetic structure of FIG. 1.

Another circuit topology which can be used with the present invention (but which is not as advantageous as the embodiment of FIG. 3A in some respects) is the decoupled-dual-transformer circuit topology shown in FIG. 2B. One transformer is formed by coils $L_2$ and $L_3$, which are tightly coupled together, and the other transformer is formed by coils $L_1$, and $L_4$, which are also tightly coupled together. A capacitor $C_2$ is interposed between windings $L_1$ and $L_2$, and a capacitor $C_3$ is interposed between windings $L_3$ and $L_4$. Switch SW1' modulates the voltage across inductor $l_1$. Capacitors $C_1$ and $C_4$ provide input and output filtering respectively.

This circuit has some resemblance to an isolated Čuk converter circuit, but has different magnetic connections and operates differently. In an isolated Čuk converter, both L1 and L4 are magnetically coupled to the L2/L3 pair. (Typically the $L_2$ and $L_3$ coils would be wound on the center leg of an E-core magnetic structure, $L_1$ would be wound on one outer leg of the same E-core magnetic structure, and $L_4$ on the other leg.) See ADVANCES IN SWITCHED-MODE POWER CONVERSION (2.ed. Middlebrook and Čuk 1983), which is hereby incorporated by reference. Thus a correct circuit diagram of an isolated Čuk converter would show a magnetic coupling path between the $L_1/L_4$ transformer and the $L_2/L_3$ transformer, but this magnetic coupling path is absent in the circuit of FIG. 2B.

By contrast, the circuit topology of FIG. 2B is implemented with a segregated magnetics structure like that of FIG. 1, and hence the $L_1/L_4$ transformer is decoupled from the $L_2/L_3$ transformer. In one sample implementation the $L_1$ and $L_4$ inductors are tightly coupled together on one pole $p_1$, and the $L_2$ and $L_3$ windings are tightly coupled together on the other pole $p_2$. However, without some degree of coupling between these two pairs, ripple cancellation will not be achieved at both input and output sides. (Ripple reduction can be achieved on one side, but not both.) Thus the topology of FIG. 2B sacrifices some of the advantages of the isolated Čuk converter, for the sake of reduced size and weight.

In a further alternative embodiment, the height l of the planar structure of FIG. 1 is therefore increased, to increase the reluctance of the return paths $\phi_1$ and $\phi_2$ and introduce some additional coupling between the two transformers of this single magnetic circuit. (Thus this alternative is a hybrid between the circuit of FIG. 2B and an isolated Čuk converter.) However, this degrades the low form factor and low volume which is preferred for magnetic circuits.

Segregated Flyback Converter

Figure 3A:
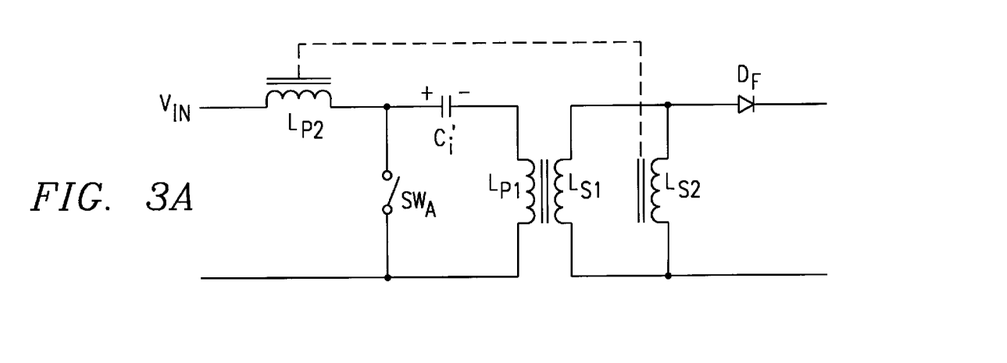
FIG. 3A shows the innovative "segregated flyback" power converter circuit topology, which can advantageously implemented using the magnetic structure of FIG. 1.

Another circuit topology which can use the magnetic structure of FIG. 1 is shown in FIG. 3A. (This topology is also believed to be independently innovative, apart from its use with the magnetic structure of FIG. 1.) This circuit topology uses two transformers with the same turns ratio: tight inductive coupling is provided between an input coil $L_{p1}$, and secondary coil $L_{s1}$. Tight inductive coupling is also provided between another primary coil $L_{p2}$ and another secondary coil $L_{s2}$. However, the $L_{p1}/L_{s1}$ coils are not coupled at all to the $L_{p2}/L_{s2}$ coils. This is preferably accomplished, using the integrated magnetic structure described above, by winding the $L_{p2}$ and $L_{s2}$ coils on one pole of a first flux circuit in a common physical magnetic structure, and winding the $L_{p1}$ and $L_{s1}$ coils, on another pole of the same structure, in a second flux circuit which is separate from the first flux circuit. The turns ratio of the $L_{p1}/L_{s1}$ pair is preferably the same (N: 1) as that of the $L_{p2}/L_{s2}$ pair. Switch $SW_A$ is operated to periodically pull one end of the input inductor $L_{p2}$ toward ground. Capacitor $C_i'$ provides coupling to the input winding $L_{p1}$. Note that the two secondaries $L_{s1}$ and $L_{s2}$ are connected in parallel, in front of an output diode $D_F$. This structure can reduce input ripple by steering ripple to the $L_{p1}$ coil. However, maximal power efficiency and density are achieved by operating the two transformers at equal duty cycles, without ripple cancellation.

Figure 3B:
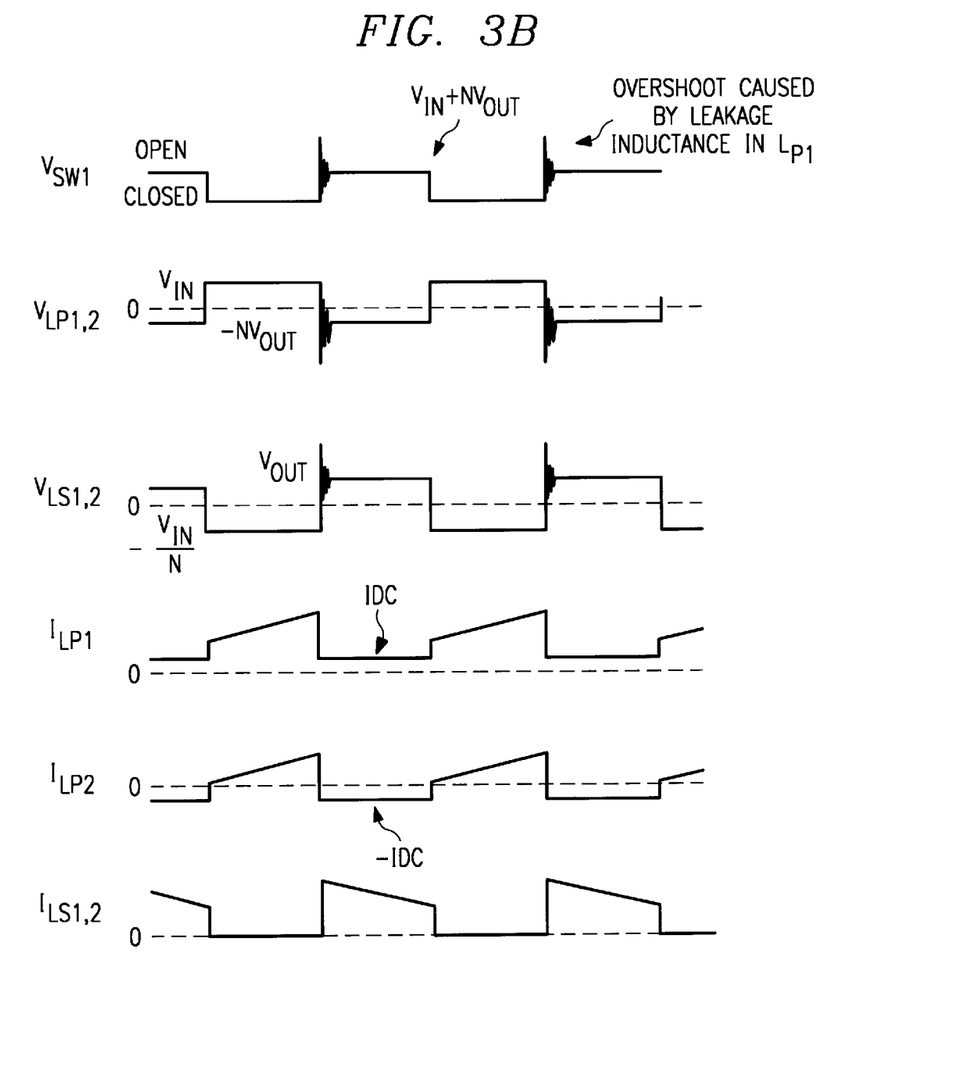
FIG. 3B is a timing diagram which shows the operation of the circuit of FIG. 3A.

FIG. 3B is a timing diagram which shows the operation of the circuit of FIG. 3A. As may be seen from this timing diagram:

When the switch $SW_A$ turns on:

the voltage $V_{SW}$ across the switch goes to zero;

the voltages $V_{LP1}$ and $V_{LP2}$ (on the two primary windings $L_{P1}$ and $L_{P2}$) both jump up to $V_{IN}$;

the voltages $V_{LS1}$ and $V_{LS2}$ (on the two secondary windings $L_{S1}$ and $L_{S2}$) jump down to $V_{IN}/N$;

the current $I_{LP1}$ on the input winding $L_{P1}$ jumps up slightly, and then ramps up steadily;

the current $I_{LP2}$ on the primary winding $L_{P2}$ jumps up slightly (to zero), and then ramps up steadily; and the currents $I_{LS1}$ and $I_{LS2}$ (on the two secondary windings $L_{S1}$, and $L_{S2}$) jump down to zero.

When the switch $SW_A$ turns off:

the voltage $V_{SW}$ across the switch jumps up to $V_{IN}+NV_{out}$ (with some overshoot due to the leakage inductance of $L_{P1}$);

the voltages $V_{LP1}$ and $V_{LP2}$ (on the two primary windings $L_{p1}$ and $L_{P2}$) both jump down to $-NV_{out}$ (with some overshoot);

the voltages $V_{LS1}$ and $V_{LS2}$ (on the two secondary windings $L_{S1}$ and $L_{S2}$) both jump up to $V_{out}$ (with some overshoot);

the current $I_{LP1}$ on the input winding $L_{P1}$ jumps down to a substantially constant value $-I_{dc}$;

the current $I_{LP2}$ on the primary winding $L_{P2}$ jumps down to a substantially constant value $-I_{dc}$;

the currents $I_{LS1}$ and $I_{LS2}$ (on the two secondary windings $L_{S1}$ and $L_{S2}$) jump up, and then ramp down steadily.

Note that the two primaries $L_{P1}$ and $L_{P2}$ preferably transfer equal amounts of energy: the DC current $-I^{dc}$ which flows in $L_{P2}$ while the switch is off reduces the energy transferred into $L_{S2}$, and the DC current $I_{dc}$ which flows in $L_{P1}$ while the switch is off increases the energy transferred into $L_{S1}$, so that the peak current into $L_{S2}$ is equal to the peak current into $L_{S1}$.

Dual-Regenerative Flyback Converter

Figure 4A:
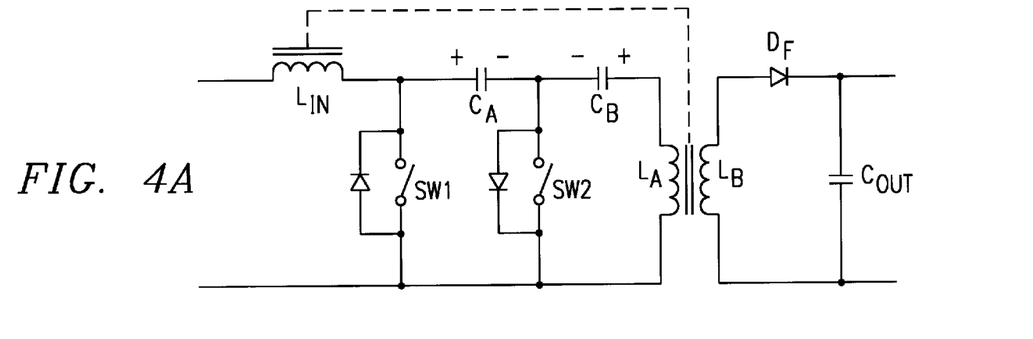
FIG. 4A shows the innovative "dual regenerative flyback" power converter circuit topology, which can advantageously implemented using the magnetic structure of FIG. 1.

FIG. 4A shows a dual regenerative flyback converter circuit. This innovative topology differs from the isolated SEPIC topology in that two switches SW1 and SW2 are used. The use of two switches serves to tightly clamp the transient voltages which, as noted above, would otherwise appear (e.g. in the isolated SEPIC topology).

An input inductor $L_{IN}$ is inductively coupled to a transformer $L_a/L_b$. The turns ratio $L_{IN}:L_a:L_b$ is N:N:1. Switches SW1 and SW2 close alternately; switch SW1 is connected from ground to the+side of capacitor $C_A$, and switch SW2 is connected from ground to the−side of capacitors $C_A$ and $C_B$. The two switches SW1 and SW2 are preferably both power MOS devices of the same size. Note that switch SW1 is connected so that its parasitic diode prevents the+side of capacitor $C_A$ from going below the input ground, and switch SW2 (also preferably a VDMOS) is connected so that its parasitic diode prevents the−side of capacitors $C_A$ and $C_B$ from going above the input ground. The energy in $L_a$ can be discharged either to $C_B$ or (through $L_b$) to the output capacitor $C_{out}$. The volt-second balance in $L_{IN}$ maintains the amp-second balance in $C_A$.

Figure 4B:
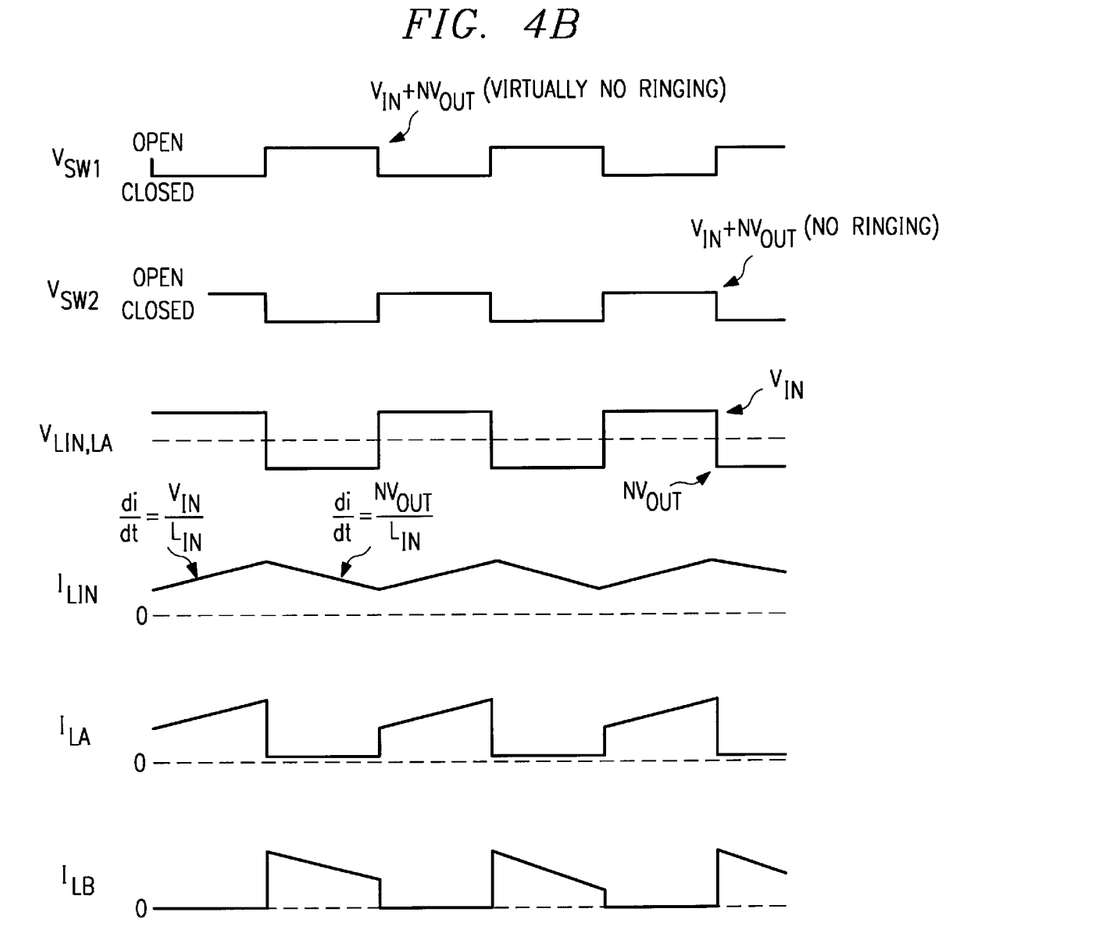
FIG. 4B is a timing diagram which the operation of the circuit of FIG. 4A.

FIG. 4B is a timing diagram which shows the operation of the circuit of FIG. 4A. Note that, in the presently preferred embodiment, switches SW1 and SW2 are operated in strict alternation.

When switch SW2 turns on and SW1 turns off:
- the voltage $V_{SW1}$ on switch SW1 jumps up to $V_{IN}+NV_{out}$ (with virtually no ringing), and the voltage on switch SW2 drops to zero;
- the voltage $V_{LIN}$ on input inductor $L_{IN}$, and the voltage $V_{La}$ on primary inductor $L_a$, both jump from $V_{IN}$ to a negative value $NV_{out}$;
- the current $1_{LIN}$ on input inductor $L_{IN}$ ramps down at a rate of $NV_{out}/L_{IN}$;
- the current $I_{La}$ on primary inductor $L_a$ drops to zero;
- the current $I_{Lb}$ on secondary inductor $L_b$ jumps up, and then ramps down.

When switch SW1 turns on and SW2 turns off:
- the voltage $V_{SW2}$ on switch SW2 jumps up to $V_{IN}+NV_{out}$ (with virtually no ringing), and the voltage $V_{SW1}$ on switch SW1 drops to zero;
- the voltage $V_{LIN}$ on input inductor $L_{IN}$, and the voltage $V_{La}$ on primary inductor $L_a$, both jump up to $V_{IN}$;
- the current $I_{LIN}$ on input inductor $L_{IN}$ ramps up at a rate of $V_{IN}/L_{IN}$;
- the current $I_{La}$ on primary inductor $L_a$ jumps up, and then ramps up; and
- the current $I_{Lb}$ on secondary inductor $L_b$ drops to zero.

In the example shown the input inductor $L_{IN}$ and transformer windings $L_a/L_b$ are wound on separate flux circuits of a single planar magnetic structure like that of FIG. 1, so that input inductor LIN is not magnetically coupled to the transformer $L_a/L_b$. However, in an alternative embodiment, inductive coupling can be added between the input inductor $L_{IN}$ and the transformer windings $L_a/L_b$, to steer ripple into the primary winding $L_a$ and so minimize input ripple.

Figure 4C:
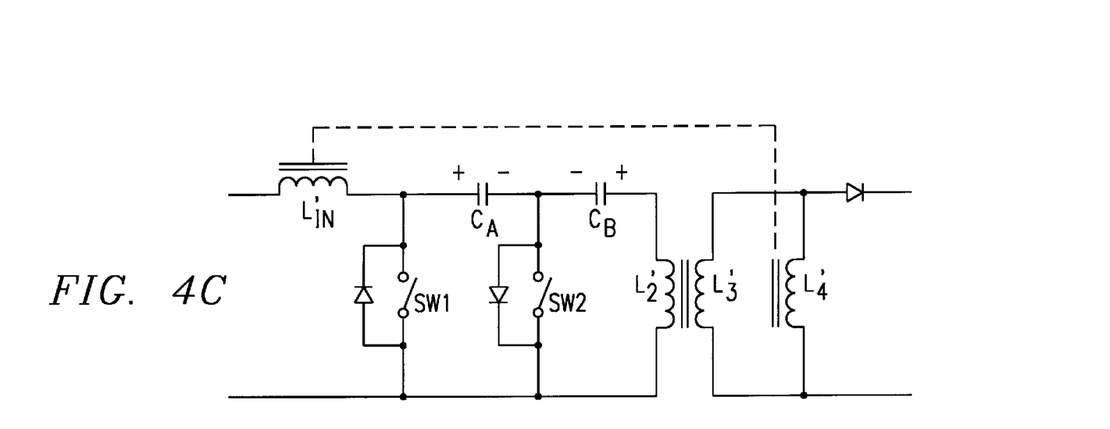
FIG. 4C shows another dual regenerative flyback converter circuit.

FIG. 4C shows another dual regenerative flyback converter circuit. This topology differs from that of FIG. 4A in that the input inductor $L_{IN}'$ is coupled to another inductor $L_4'$ on the output side. This embodiment may be slightly slower than that of FIG. 4A to stabilize at startup, but otherwise retains many advantages. When this circuit topology is (advantageously) implemented with the magnetic structure of FIG. 1, the coils $L_2'$ and $L_3'$ are preferably wound on one pole of the core, and coils $L_{IN}'$ and $L_4'$ are both wound on another pole of the core.

Innovative Portable Computer

Figure 8:
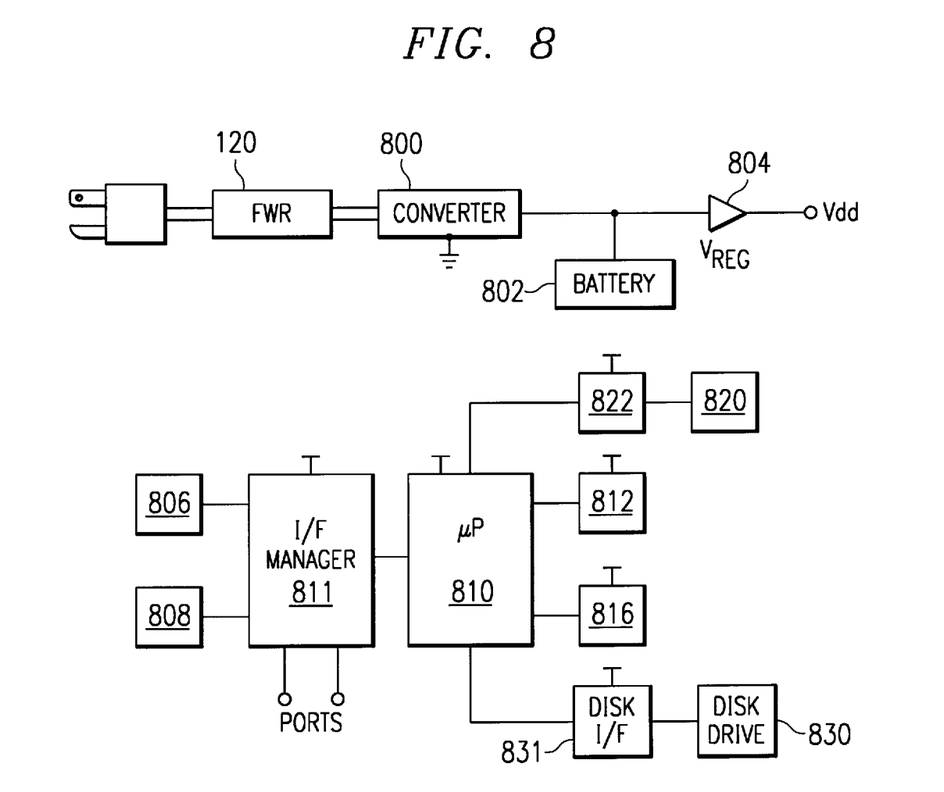
FIG. 8 shows a block diagram of a portable computer system according to the presently preferred embodiment.

FIG. 8 shows a portable computer including a power converter 800 as in FIG. 3A, 4A, or 2A, which is used to charge the battery 802. The power converter is connected, through a full-wave bridge rectifier 120, to draw power from AC mains, and is connected to provide a DC voltage to the battery. The battery 802 (or the converter 800), connected through a voltage regulator 804, is able to power the complete portable computer system, which includes in this example:

- user input devices (e.g. keyboard 806 and mouse 808);
- at least one microprocessor 810 which is operatively connected to receive inputs from said input device, through an interface manager chip 811 (which also provides an interface to the various ports);
- memory (e.g. flash memory 812 and RAM 816), which is accessible by the microprocessor;
- a data output device (e.g. display 820 and display driver card 822) which is connected to output data generated by microprocessor; and
- a magnetic disk drive 830 which is read-write accessible, through an interface unit 831, by the microprocessor 810.

Optionally, of course, many other components can be included, and this configuration is not definitive by any means.

According to a disclosed class of innovative embodiments, there is provided a power converter circuit comprising: an input winding operatively connected at a first end thereof to an input power terminal; an output winding inductively coupled to said input winding, and operatively connected to provide current at an output terminal; an intermediate capacitor and a primary winding, both connected in series with said input winding a switch connected to selectably vary the voltage of a node between said input and primary windings; and a secondary winding connected in parallel with said output winding, and inductively coupled to said primary winding but not to said input winding.

According to another disclosed class of innovative embodiments, there is provided a power converter circuit, comprising: an input winding operatively connected at a first end thereof to an input power terminal; a first intermediate capacitor, a second intermediate capacitor, and a primary winding, all jointly connected in series with said input winding; first and second switches connected to selectably vary the voltage of first and second nodes of one of said intermediate capacitors; and a secondary winding inductively coupled to said primary winding and to said input winding, and operatively connected to provide current at an output terminal.

According to another disclosed class of innovative embodiments, there is provided a circuit, comprising: an input winding operatively connected at a first end thereof to an input power-terminal; an output winding inductively coupled to said input winding, and operatively connected to provide current at an output terminal; a first intermediate capacitor, a second intermediate capacitor, and a primary winding, all jointly connected in series with said input winding; first and second switches connected to selectably vary the voltage of first and second nodes of one of said intermediate capacitors; and a secondary winding connected in parallel with said output winding, and inductively coupled to said primary winding but not to said input winding.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, other circuit elements can be added to, or substituted into, the specific circuit topologies shown.

For another example, within the constraints well-known to those of ordinary skill, power MOS transistors can be replaced by IGBT and/or MCT devices, with appropriate allowance for reduced turn-off times. In some applications power bipolar devices can also be used.

For example, as will be obvious to those of ordinary skill in the art, other circuit elements can be added to, or substituted into, the specific circuit topologies shown.

For another example, within the constraints well-known to those of ordinary skill, nonlinear devices can be added in series with (or used to replace) resistors, to increase the impedance of load devices.

It should also be noted that the innovative circuit topologies of FIGS. 3A and 4A do not have to be used with the magnetic structure of FIG. 1, although this combination is believed to be particularly advantageous.

Additional discussion of alternatives and implementation details known to those skilled in the art can be found in the publications cited in the Background section of the present application, and in the following publications, all of which are hereby incorporated by reference: Billings, SWITCH-MODE POWER SUPPLY HANDBOOK (1989); Chetty, SWITCH-MODE POWER SUPPLY DESIGN (1986); Chryssis, HIGH FREQUENCY SWITCHING POWER SUPPLIES (2.ed. 1989); Flanagan, HANDBOOK OF TRANSFORMER DESIGN & APPLICATIONS (2.ed. 1993); Gottlieb, POWER SUPPLIES, SWITCHING REGULATORS, INVERTERS, AND CONVERTERS (2.ed. 1994); Hoft, SEMICONDUCTOR POWER ELECTRONICS (1986); Lenk, SIMPLIFIED DESIGN OF SWITCHING POWER SUPPLIES (1995); Mazda, POWER ELECTRONICS HANDBOOK (1990); Mohan et al., POWER ELECTRONICS (2.ed. 1995); Nasar, ELECTRIC MACHINES AND TRANSFORMERS (1984); Nave, POWER LINE FILTER DESIGN FOR SWITCHED-MODE POWER SUPPLIES (1991); REACTIVE POWER: BASICS, PROBLEMS AND SOLUTIONS (ed.Sheble 1987); Severns and Bloom, MODERN DC-TO-DC SWITCHMODE POWER CONVERTER CIRCUITS (1984); Shepard, POWER SUPPLIES (1984); Sum, SWITCH MODE POWER CONVERSION (1988); Tihanyi, ELECTROMAGNETIC COMPATIBILITY IN POWER ELECTRONICS (1995); Williams, POWER ELECTRONICS (1987); Wood, SWITCHING POWER CONVERTERS (1981); the proceedings of the annual INTERNATIONAL HIGH-FREQUENCY POWER CONVERSION conferences from 1986 to date; and the proceedings of the POWERCON and POWER ELECTRONICS SPECIALISTS conferences from 1980 to date. All of these books, and the references cited in them, are hereby incorporated by reference.

What is claimed is:

1. A computer system comprising:
   a power supply containing at least one power converter circuit;
   a programmable processor and a memory, connected to be powered by said power supply; and
   at least one user input device, and at least one output device;
   wherein said power converter circuit comprises:
   an input winding operatively connected at a first end thereof to an input power terminal;
   an output winding inductively coupled to said input winding, and operatively connected to provide current at an output terminal;
   an intermediate capacitor and a primary winding, both connected in series with said input winding;
   a switch connected to selectably vary the voltage of a node between said input and primary windings; and
   a secondary winding connected in parallel with said output winding, and inductively coupled to said primary winding but not to said input winding.

2. The system of claim 1, wherein all said windings are wound on a low-profile integrated magnetic structure which includes multiple separate flux paths, and some of said windings are decoupled from others of said windings.

3. The system of claim 1, wherein all said windings are wound on a common magnetic structure.

4. The system of claim 1, wherein said power output terminals are configured to provide power to a computer system.

5. The system of claim 1, wherein said power output terminals are configured to provide power to an electrical storage and recharging system.

6. The system of claim 1, wherein said switch is a VDMOS power transistor.

7. A computer system comprising:
   a power supply containing at least one power converter circuit;
   a programmable processor and a memory, connected to be powered by said power supply; and
   at least one user input device, and at least one output device;
   wherein said power converter circuit comprises:
   an input winding operatively connected at a first end thereof to an input power terminal;
   a first intermediate capacitor, a second intermediate capacitor, and a primary winding, all jointly connected in series with said input winding;
   first and second switches connected to selectably vary the voltage of first and second nodes of one of said intermediate capacitors; and
   a secondary winding inductively coupled to said primary winding and to said input winding, and operatively connected to provide current at an output terminal.

8. The system of claim 7, wherein all said windings are wound on a low-profile integrated magnetic structure which includes multiple separate flux paths, and some of said windings are decoupled from others of said windings.

9. The system of claim 7, wherein said power output terminals are connected to provide power to a portable computer system.

10. The system of claim 7, wherein said power output terminals are operatively connected to charge a battery.

11. The system of claim 7, wherein at least one said capacitor is electrolytic.

12. The system of claim 7, wherein all said windings are wound on a common magnetic structure.

13. The system of claim 7, wherein each said switch is a VDMOS power transistor.

14. A computer system comprising:
   a power supply containing at least one power converter circuit;
   a programmable processor and a memory, connected to be powered by said power supply; and at least one user input device, and at least one output device;

wherein said power converter circuit comprises:

an input winding operatively connected at a first end thereof to an input power terminal;

an output winding inductively coupled to said input winding, and operatively connected to provide current at an output terminal;

a first intermediate capacitor, a second intermediate capacitor, and a primary winding, all jointly connected in series with said input winding;

first and second switches connected to selectably vary the voltage of first and second nodes of one of said intermediate capacitors; and a secondary winding connected in parallel with said output winding, and inductively coupled to said primary winding but not to said input winding.

15. The system of claim 14, wherein all said windings are wound on a low-profile integrated magnetic structure which includes multiple separate flux paths, and some of said windings are decoupled from others of said windings.

16. The system of claim 14, wherein said power output terminals are connected to provide power to a portable computer system.

17. The system of claim 14, wherein said power output terminals are operatively connected to charge a battery.

18. The system of claim 14, wherein all said windings are wound on a common magnetic structure.

19. The system of claim 14, wherein at least one said capacitor is electrolytic.

20. The system of claim 14, wherein said switch is a VDMOS power transistor.

* * * * *